(12) United States Patent
Wade (10) Patent No.: US 12,077,198 B2
(45) Date of Patent: *Sep. 3, 2024

(54) AUTOMATED WAYSIDE ASSET MONITORING WITH OPTICAL IMAGING AND VISUALIZATION

(71) Applicant: Jack Wade, La Jolla, CA (US)

(72) Inventor: Jack Wade, La Jolla, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/948,123

(22) Filed: Sep. 19, 2022

(65) Prior Publication Data

US 2023/0114620 A1 Apr. 13, 2023

Related U.S. Application Data

(63) Continuation of application No. 17/023,155, filed on Sep. 16, 2020, now Pat. No. 11,472,453, which is a continuation of application No. 16/215,342, filed on Dec. 10, 2018, now Pat. No. 10,822,008, which is a continuation of application No. 15/631,381, filed on Jun. 23, 2017, now Pat. No. 10,179,597.

(60) Provisional application No. 62/355,053, filed on Jun. 27, 2016.

(51) Int. Cl.
| | | |
|---|---|---|
| *B61L 23/04* | (2006.01) | |
| *B61L 27/53* | (2022.01) | |
| *B61L 27/70* | (2022.01) | |
| *G06V 10/44* | (2022.01) | |
| *G06V 10/82* | (2022.01) | |
| *G06V 20/40* | (2022.01) | |
| *G06V 20/56* | (2022.01) | |

(52) U.S. Cl.
CPC ............ *B61L 23/04* (2013.01); *B61L 27/53* (2022.01); *B61L 27/70* (2022.01); *G06V 10/454* (2022.01); *G06V 10/82* (2022.01); *G06V 20/41* (2022.01); *G06V 20/56* (2022.01); *B61L 2201/00* (2013.01)

(58) Field of Classification Search
CPC .. B61L 27/0088; B61L 23/04; B61L 27/0005; B61L 2201/00; G06K 9/00718; G06K 9/00791; G06K 9/4628
USPC .......................................................... 701/19
See application file for complete search history.

(56) References Cited

U.S. PATENT DOCUMENTS

| | | | | |
|---|---|---|---|---|
| 7,593,963 | B2* | 9/2009 | Ballesty | B61L 27/57 |
| 2004/0117358 | A1* | 6/2004 | von Kaenel | G06F 16/29 |
| 2009/0187296 | A1* | 7/2009 | James | B61L 23/14 |
| | | | | 701/19 |
| 2016/0148433 | A1* | 5/2016 | Petrovskaya | G06T 19/006 |
| | | | | 345/633 |

* cited by examiner

*Primary Examiner* — Yazan A Soofi
(74) *Attorney, Agent, or Firm* — Olivo IP Law Group P.C.; John W. Olivo, Jr.

(57) ABSTRACT

The Automated Wayside Asset Monitoring system utilizes a camera-based optical imaging device and an image database to provide intelligence, surveillance and reconnaissance of environmental geographical information pertaining to railway transportation. Various components of the Automated Wayside Asset Monitoring system can provide features and functions that can facilitate the operation and improve the safety of transportation via a railway vehicle.

12 Claims, 6 Drawing Sheets

AUTOMATED WAYSIDE ASSET MONITORING WITH OPTICAL IMAGING AND VISUALIZATION

PRIORITY CLAIMS

This application is a continuation of U.S. patent application Ser. No. 17/023,155, filed Sep. 16, 2020, which is a continuation of U.S. patent application Ser. No. 16/215,342, filed on Dec. 10, 2018, which is a continuation of U.S. patent application Ser. No. 15/631,381, filed on Jun. 23, 2017, and issued as U.S. Pat. No. 10,179,597 on Jan. 15, 2019, which claims the benefit of U.S. Provisional Patent Application No. 62/355,053, filed on Jun. 27, 2016, the contents of which are incorporated herein by reference.

BACKGROUND OF THE INVENTION

The present disclosure relates to transportation infrastructure generally, and more particularly, to methods and systems for vehicle-centric railway wayside asset monitoring and system optimization.

The worldwide demand for passenger and freight travel is expected to double by 2050, compared with 2010 levels requiring an additional 200,000 miles of rail track. Meeting this demand will require increased train speeds, loads and frequency, adding stress on the aging railway infrastructure. Railroads and regulatory bodies have adopted programs to address growing safety needs. One of these initiatives is the Positive Train Control (PTC) regulation resulting from the United States Railway Safety Act of 2008 (RSIA). These safety initiatives, coupled with a need for improved operations, require a recurrent mapping and monitoring of railroad assets.

In the United States, the Rail Safety Improvement Act of 2008 requires passenger railroad and Class I railroad to install positive train control (PTC) on main lines used to transport passengers or toxic-by-inhalation hazardous materials. One portion of this requirement entails mapping over 60,000 miles of right-of-way and 476,000 assets.

The asset database, including critical features such as the presence of signals and switches, must be validated asset-by-asset and mile-by-mile at regular intervals. The railroads must ensure that what is displayed to the train crew via the track database and onboard system reflects what is shown by railroad signal and what is actually present on the ground. Furthermore, construction and validation of the rail asset database is a continuous process since almost all changes to the railroad infrastructure require its modification and re-validation. Validation of the database is a time-consuming and labor-intensive process. What is needed is a system to create, update, validate and access information about the location and status of wayside assets.

With respect to geographic information systems (GIS), the accuracy of the information required for PTC is significantly more precise than what is required to run a safe and efficient railroad in a non-PTC environment. Today, there are approximately 500,000 critical assets that must be geo-located to a horizontal precision of less than 2.2 meters (~7 feet) and a vertical precision of 0.8 m (~2 feet) to provide the accuracy necessary to safely warn or stop a locomotive. Additionally, yards, industry, and other connecting track must also be mapped to account for entry onto and exit from PTC track totaling more than 63,000 miles of right-of-way.

There are substantial challenges to developing and implementing a sustainable process to document and update the location every time one of the over 460,000 critical PTC assets is moved by more than 1 foot. Updating the PTC track database is a continuous process since almost all changes that occur in the railroad infrastructure require reconstruction and revalidation.

In terms of the PTC initiative, one of the most challenging aspects is the requirement for interoperability and real-time communication between the various system components. This is in part due to the fact that the component systems are developed by various suppliers, and the implementations by each differ across the various railroad companies. However, there have been unforeseen challenges in retrofitting an aging railroad infrastructure that was not designed with today's technologies in mind. All these factors have led to significant program delays and have raised questions about the practicality of the current approach. In light of such challenges, the ability to implement one of the component systems, the track database in a manner that is not strictly dependent on the operation of other components subsystems offers a way forward to improving safety and advancing progress toward meeting regulatory requirements.

SUMMARY OF THE INVENTION

This system for wayside asset monitoring comprises a portable camera system that mounts to a vehicle (track geometry car, Hi-Rail truck, unmanned aerial vehicle, etc.) that travels linearly along the track collecting optical camera images of wayside assets and tagging each image with metadata such as geo-location, etc. The data is stored by the camera system and subsequently processed to identify critical assets and create and/or update and validate the track database. The database may be accessed by train operators during trips using an onboard computer that runs a software dashboard to provide them information that improves situational awareness. The system does not require any modification to trains. Nor does it require installation of GPS antennas or any other special equipment or markings at wayside locations.

The present invention relates to Intelligence, Surveillance and Reconnaissance ("ISR") optical imaging and visualization technology. The system comprises of methods that utilize ISR imaging as a means of asset monitoring through cameras mounted to the roof of a hi-rail vehicle in order to detect and validate specific assets. The system also comprises of a database that stores the asset monitoring data captured by the camera. This database is used within the situational awareness dashboard where high resolution video wayside imagery is captured for the asset monitoring system to augment the visual acuity of the long haul locomotive engineer and can therefor improve the safe operation of the train in degraded visual environments.

present invention automates the task of monitoring railway wayside signals, signage, bridges, tracks, guardrails, switches, foliage, etc. The system uses a high-resolution camera array mounted on a hy-rail to optically surveil the wayside at speed without human intervention. The camera array collects high-resolution 360° video of the wayside to identify and track assets to validate location, visual appearance, and other important information required for regulatory compliance, safety, and operational efficiency. Wayside clearance and restricted areas are monitored for degradation and intrusive structures. The camera system updates a video archive with GPS-synchronized metadata for processing against a track database. Assets with detected anomalies are tagged for follow-up operator inspection using a desktop software application that automatically validates the track database. The system employs deep learning algorithms with convolutional neural networks (CNN) for object identification and change detection.

As a train proceeds down the track its GPS coordinates are used to access a video archive and present a synchronized view from a previous run. The operator can press a button and see a side-by-side video of what the camera is seeing now versus what it saw previously at the same exact spot—particularly helpful during periods of degraded visibility. A "Look Ahead" capability can stream video of what's around the corner, 1, 2 miles or minutes ahead to increase situational awareness and be better prepared for travel through high-risk areas. Advanced algorithms can augment human perception and response by processing camera imagery in real time. Real-time analytics can mitigate crew visual fatigue, enhance safety awareness, and warn of dangers not discernible by the human eye. The system can be configured to keep operators advised of special conditions and requirements defined by GPS coordinates, operating conditions, or events.

When an event occurs, the Dashboard can provide procedural and policy guidance. For example, the system might be configured to monitor adherence to signals and signs, or advise when quiet zones hours are in effect, or alert when shrubbery exceeds the height limit. A computer scripting language is available for system configuration and management. The scripting language is used to describe the desired system behavior at a particular geolocation. It is used to define specific protocols for the crew to follow in response to certain wayside signals or anomalous conditions.

The camera system includes an array of cameras configured to collect a high-resolution 360° video of the wayside. When performing audit and/or survey tasks object detection can be uni-directional meaning that the system detects critical assets facing against the direction of travel or alternatively detection can be bi-directional meaning that the system detects critical assets facing both against the direction of travel and with that direction. Examples of types of objects tracked include Speed Signs category, Train Control Signals category, and Milepost objects.

The camera system incorporates proprietary image processing technology that improves visibility in imagery captured in degraded vision environment such a fog, blinding light, etc. Optical image processing and object recognition techniques are applied to the image frames captured by the camera system to find and classify objects and to measure with precision and to build and validate a database. The system employs various technologies to do this including machine vision and object recognition and tracking. Object recognition can be implemented using Convolutional Neural Network (CNN) technology whereby the system can be trained to identify specific objects by analyzing a large sample of similar objects. Vision-based neural networks attempt to emulate the way a human brain works to recognize specific objects by passing the visual input through a series of many layers for processing. In humans, images flow from the retina into the primary visual cortex and then infrared temporal (IT) cortex. In neural networks the visual data is passed through a series of mathematical models, each specialized in identifying a visual element such as a dot or a line. The mathematical model for an individual element can be very simple, but when thousands and millions of these are combined it is possible to get very complex transformations from the raw signals that yield representations that are very good for object recognition. Neural networks are "trained" to identify certain objects by using machine-learning algorithms to analyze datasets that contain very large numbers of images, each one of which is annotated by humans with different levels of identification. Over time, the system learns as it is exposed to more and more images and becomes increasingly accurate and reliable in recognizing specific types of objects.

The system includes object tracking and identification technology that recognizes specific types of objects at specific locations. Assets with detected anomalies are tagged for follow-up operator inspection using a desktop software application that automatically validates the track database.

A Situational Awareness Dashboard software application uses information from the database to provide train operators tools and information to improve situational awareness and decision making. In conditions of limited visibility, train operators can view side-by-side image streams to compare real-time trip imagery with recorded imagery of the previous trip to gain a sense of the lay of the land. When asset anomalies are detected by the system, procedural and policy information can be presented to the train operator to assist them. The Situational Awareness Dashboard could monitor adherence to signals and signs or advise when quiet zones hours are in effect so that the horn isn't sounded.

These and other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein.

DETAILED DESCRIPTION OF THE PREFERRED EMBODIMENT

Figure 1:
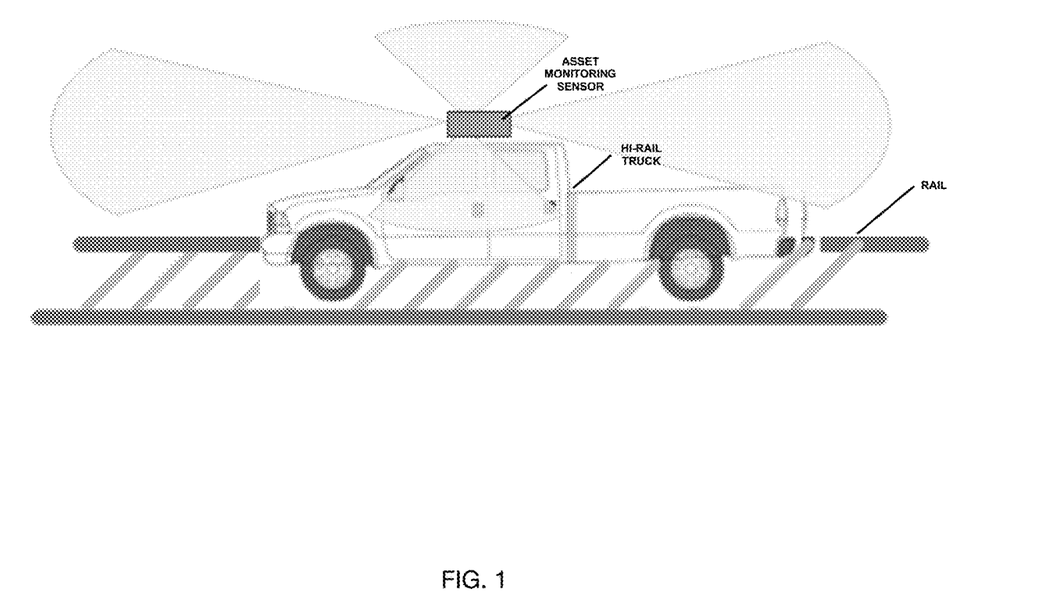
FIG. 1 is a schematic illustration of the rail asset monitoring system sensor mounted to the roof of a hi-rail vehicle.

FIG. 1 is a schematic illustration of the rail asset monitoring system sensor mounted to the roof of a hi-rail vehicle. In accordance with the preferred embodiment of the present invention, wayside assets are tracked using an off-track vehicle such as a hi-rail truck equipped with an apparatus that includes one or more cameras to capture image data and metadata of the assets and generate an image stream. The apparatus is designed to be portable such that it can be quickly mounted to a vehicle and perform surveillance, image collection, and object identification and verification functions at high speeds appropriate to the vehicle and pathway.

Figure 2:
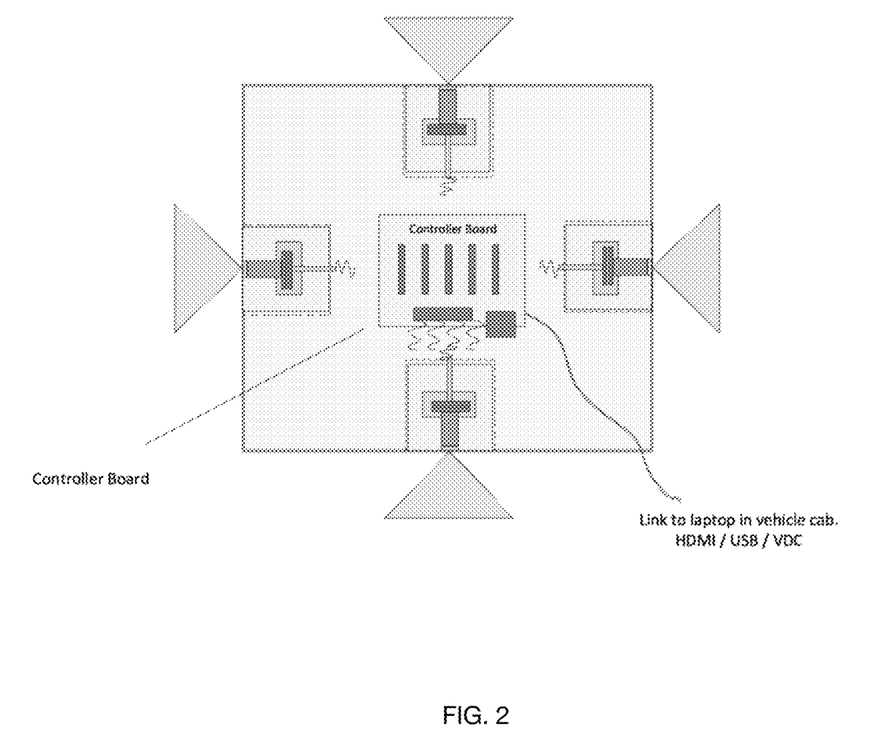
FIG. 2 is a schematic illustration of the top view of the mounted rail asset monitoring system sensor.

FIG. 2 is a schematic illustration of the top view of the mounted rail asset monitoring system sensor. In accordance with the preferred embodiment of the present invention, the camera apparatus is enclosed a sealed chassis the ingress protection rated IP66. The enclosed electronics conform to railroad industry standards and specification. The chassis is equipped with a removable quick-connect/disconnect system for mounting to the roof of Ford F-150 truck or similar vehicle. The camera lens windows are protected with changeable shields to avoid scratches and dings, etc. A cable from the apparatus enters the vehicle cab through a window seal to provide the DC power, HDMI, and USB connectivity to a laptop inside the cab so a passenger can view the camera feeds and interact with the system.

In one embodiment, five miniature cameras are connected to the chassis via Power over Ethernet and the apparatus can be magnetically mounted to the top or sides of the vehicle to provide the best view. Five cameras are used rather than four to avoid image warping when the camera image streams are combined in a mosaic fashion to create a 360-degree view around the truck.

In one embodiment the apparatus controller houses a GigE network switch that connects to the cameras, one image processing system board for each of the camera, an HDMI quad mixer chip to combine the individual processed camera image streams into a single image stream and an HDMI connector to output the image stream. The chassis includes a power supply, an IMX processor, a real-time clock, a GPS receiver, a 6-axis MEMS accelerometer/gyroscope device, an acoustic sensor, an ambient light sensor, a H.264 encoder and a removable solid state drive ("SSD").

The individual image processing boards for each camera include an IMX processor for decoding the camera image stream and for inserting metadata from other sensors and an FPGA that applies specialized algorithms for image enhancement. After the camera image stream is processed it is pushed to the controller's IMX processor via the GigE switch and also a mirrored stream is output via HDMI so the operator can view it.

Image streams captured by the camera apparatus are stored on the removable store device. The storage device can be removed from the camera apparatus and connected to a computer system for post-collection processing of the image stream as described above.

Figure 3:
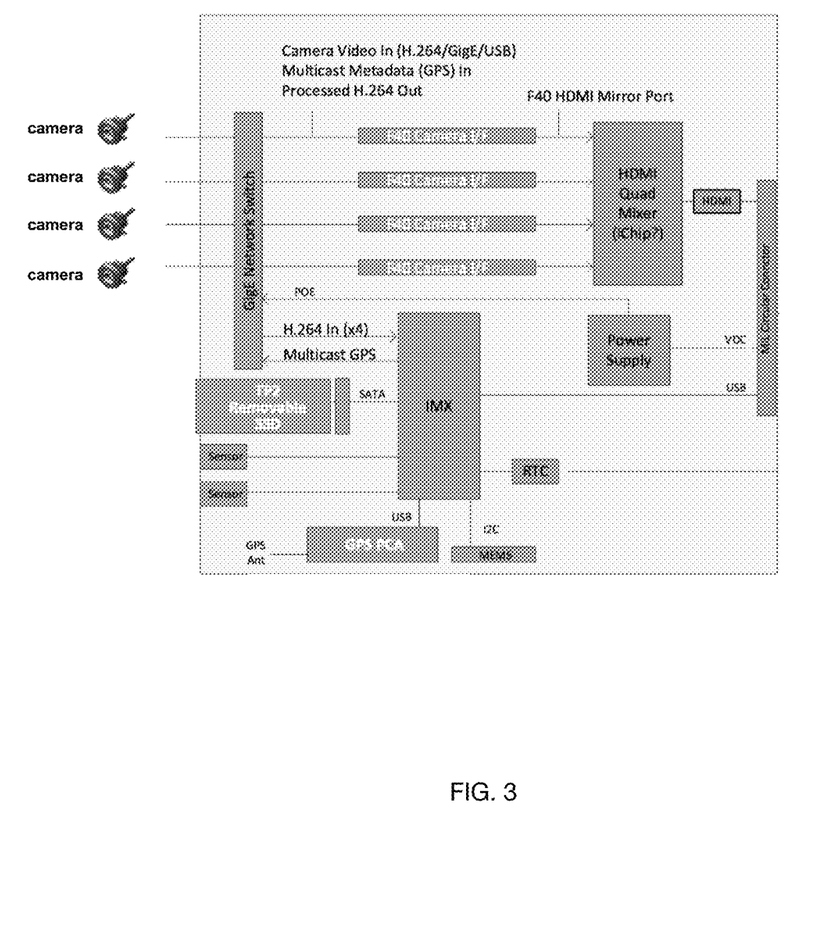
FIG. 3 is a schematic illustration of the hardware used in rail asset monitoring system sensor.

FIG. 3 is a schematic illustration of the hardware used in rail asset monitoring system sensor. In accordance with the preferred embodiment of the present invention, the basic system contains an electronics module that manages and synchronizes multiple cameras and sensors to surveil the way forward and track wayside. Baseline functionality provides real-time image processing to enable cameras to see through visual obfuscation while building a database of GPS-synchronized images. Image streams from multiple HD cameras can be combined into a single stream with multiple windows, such as quad-view. The cameras can include an optional Time of Flight ("ToF") Sensor to measure distance. The cameras may be removable and can be positioned on top of or inside of the vehicle to provide up to a 360-degree field of view. Image streams from the camera can be a series of still images frames with location metadata, rather than a conventional video stream.

The apparatus includes a GPS capability and geo-location metadata that can be included in the image stream. The GPS can be continually recalibrated using geo-locations of known fixed structures identified in the database and Real Time Kinematic ("RTK") satellite navigation.

The apparatus includes image processing technology that improves visibility in degraded vision environment such a fog or blinding light.

The apparatus includes object tracking and identification technology that recognizes specific types of objects at specific locations. The apparatus includes a storage device for retaining data received from the various sensors and stores image streams for later processing. The storage devices can be a removable drive or removable media so that data can be transported to another system for further processing.

The apparatus can include an audio sensor and audio metadata can be included in the image stream. The audio sensor can be used to detect horns, crossings bells, quiet zones.

The apparatus can include a MEMS inertial accelerometer and gyroscopic sensor and positional metadata can be included in the image stream. MEMS sensor can be used to analyze grade, tilt, acceleration, speed, and other important criteria.

The apparatus can include a wireless communication module. Wireless communication can be used to: transmit image streams and metadata; to synchronize a local copy of the database with a remote version; to provide system command and control information.

The apparatus can include an ambient light sensor. Ambient light sensors can be used to validate areas requiring lighting such as tunnels and bridges.

Figure 4:
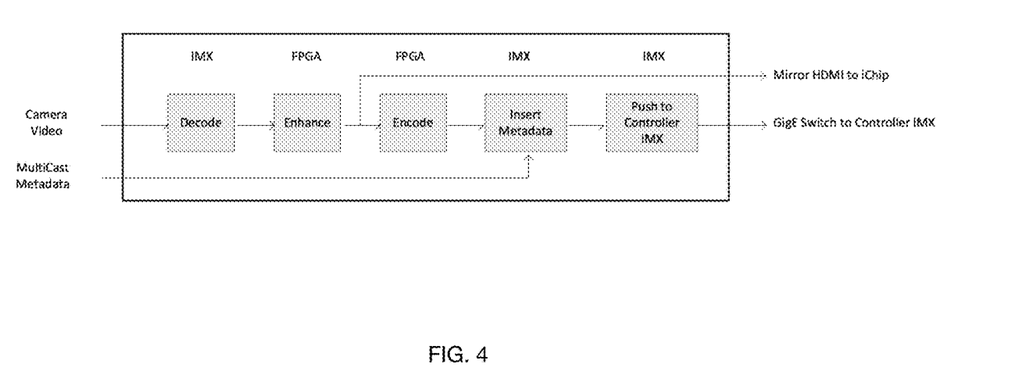
FIG. 4 is a block diagram of the monitoring system data collection and aggregation process.

FIG. 4 is a block diagram showing the flow of image data through the monitoring system data collection and aggregation process. In accordance with the preferred embodiment of the present invention, the apparatus can automatically identify, record, and verify the geo-location and status of wayside objects as it moves along railroad tracks, streets and highways, or other vehicle pathways. The purpose of the system is to: create an initial database of objects of interest identified along a wayside, and; thereafter, using a previously created database, confirm the position and status of previously identified objects, and; add new objects to an existing database. Image streams can be viewed during collection by an operator in the vehicle and potentially manually processed. However, this is optional and the preferred method is to post-process the collected data electronically or with operator assistance to changes and update the database. The system can also be used for optical surveillance and monitoring for situational awareness, collision warnings, infrastructure inspection, and safety or risk mitigation.

Optical image processing and object recognition using image frames are used to find and classify the object and to measure with precision and to use the optics to validate a database or to build a database. Various technologies including machine vision and object recognition and tracking are implemented in the system's software and/or hardware. Object recognition can be implemented using Convolutional Neural Network (CNN) technology whereby the system can be trained to identify specific objects by analyzing a large sample of similar objects. Or other algorithms and approaches such as feature-based similarity search in 3D object databases may be used.

A computer scripting language can be used for system management to define protocols to execute in response to wayside signals or an anomalous condition in the wayside. For each geo-location, the railroad company can provide a program using the scripting language to describe the desired system behavior at a particular geo-location. Look for this; measure that. Is it this color? Is at this distance? Is it making this noise?

Figure 5:
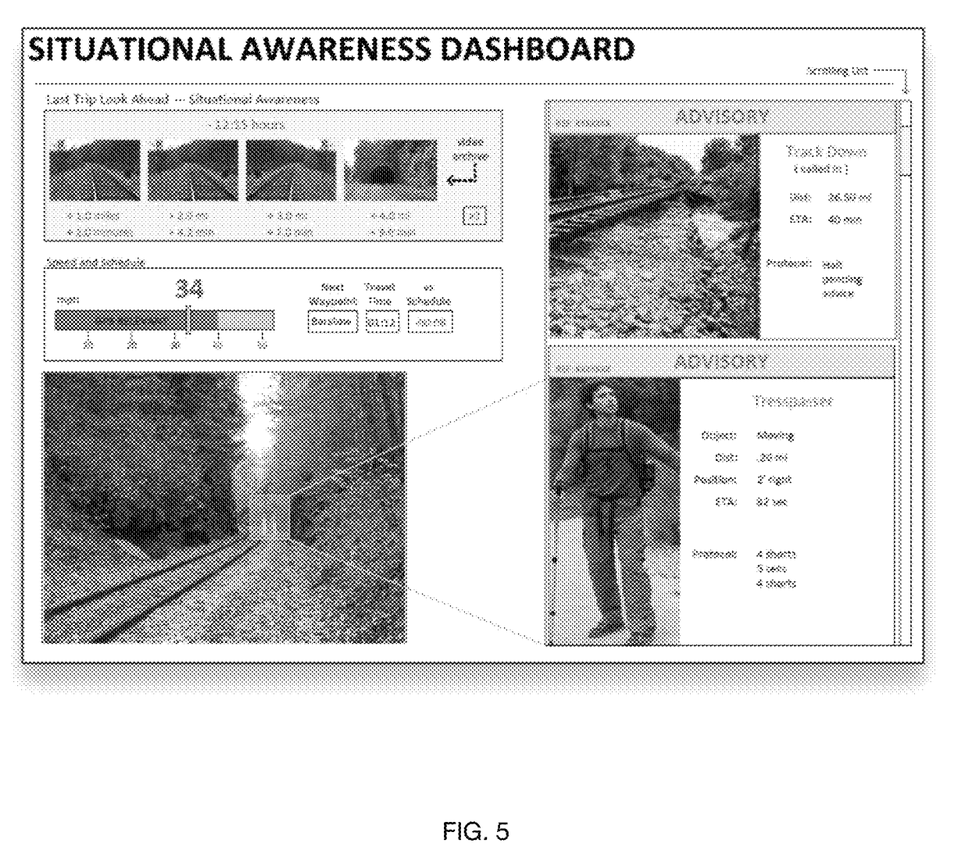
FIG. 5 is an illustrated representation of the situational awareness dashboard interface.

FIG. 5 is an illustrated representation of the Situational Awareness Dashboard User Interface. In accordance with the preferred embodiment of the present invention, a Situational Awareness Dashboard software application uses information from the database to provide the train crew tools and information to improve situational awareness and decision making. In conditions of limited visibility, crew members can view side-by-side image streams to compare real-time trip imagery with recorded imagery of the previous trip to gain a sense of the lay of the land. When asset anomalies are detected by the system, procedural and policy information can be presented to the crew to assist them. The Situational Awareness Dashboard could monitor adherence to signals and signs or advise when quiet zones hours are in effect so that the horn isn't sounded, etc.

Figure 6:
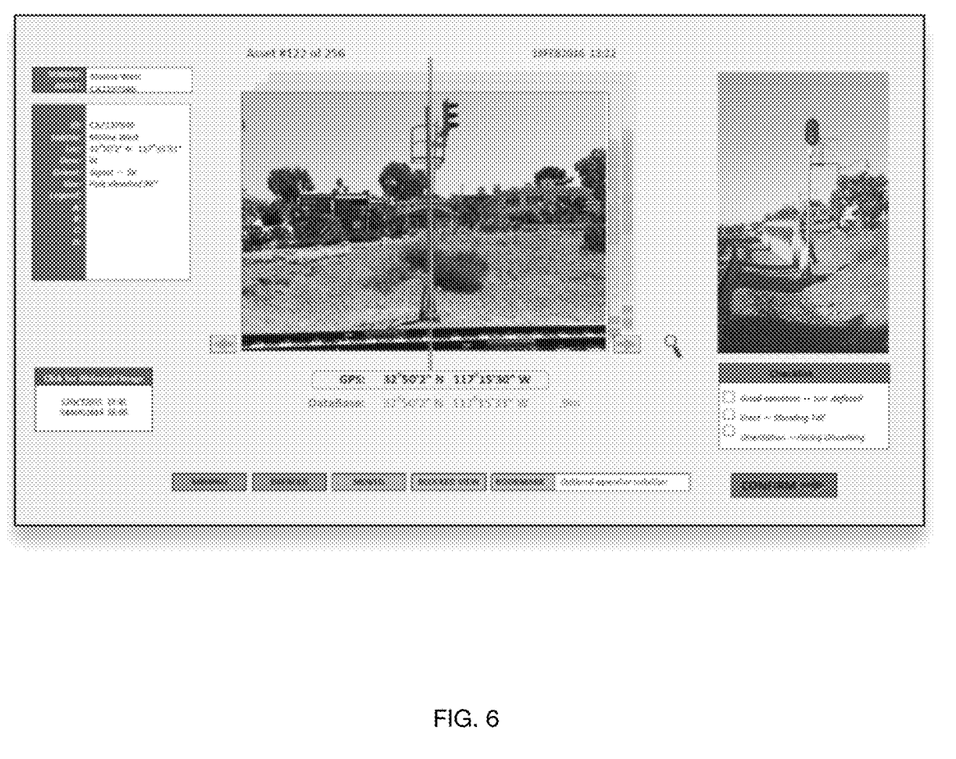
FIG. 6 is an illustrated representation of how wayside rail asset monitoring data is presented on the back-end work station where a human operator can review and validate the information before the asset database is updated.

FIG. 6 is an illustrated representation of how wayside rail asset monitoring data is presented on an Operator Workstation, which is part of the back-end processing software that may be associated with the present invention. In accordance with the preferred embodiment of the present invention, a database is used to track wayside assets and the database can be validated and updated using image data and metadata from the apparatus. If an asset database does not yet exist, the image data can be used to create a new database and populate it. The database can be generated automatically using the computer system. A human operator can interact with the computer system to view image data, check results or make changes to the database.

If an asset database already exists, the image data can be used to validate and update the database. The database can be updated and validated automatically using a computer system that compares the presence or absence of identified assets at designated locations. A human operator can interact with the computer system to view image data, check results or make changes to the database. The system can generate reports such as a report showing a list of items in the database that have changed. The database contains descriptions of objects of interest that are based on one or more previously captured images, representative similarity images, descriptive metrics, and mathematical models.

The database of objects contains the object's name, type, geo-location using GPS latitude and longitude, horizontal and vertical distance from the vehicle, pathway or known reference point, a history of images collected, a list of physical and visual characteristics and reference images used to identify the object, pointers to executable user-programmable scripts that describe how to validate the object's status, and how to report the verification results. The database supports a new scripting language that allows users to describe objects of interest in detail and to specify actions to be taken when certain objects are identified by the systems or marked as absent.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

Embodiments presented are particular ways to realize the invention and are not inclusive of all ways possible. Therefore, there may exist embodiments that do not deviate from the spirit and scope of this disclosure. It will be appreciated that a great plurality of alternative versions are possible.

What is claimed is:
1. A transportation management system, comprising:
a display device configured to display information to an operator; and
a controller in electronic communication with said display device and a central control device and including:
a network switch configured to receive input data from one or more transportation control systems and generate a single image stream based on the input data from the one or more transportation control systems in response to said central control device;
a business systems module configured to receive input data from one or more transportation data management systems and for providing performance data to said central control device; and
an electronics module configured to:
identify discrepancies among the input data from the one or more transportation control systems and railroad data management systems and for reporting said discrepancies to said central control device; and
generate corrected input data based on the input data from the one or more transportation control systems and the railroad data management systems;
wherein the controller is configured to display one or more graphical user interfaces on the display device based at least in part on the corrected input data and causes a change of position of transportation assets in response to a cumulative collection of said discrepancies.

2. The transportation management system of claim 1 wherein real time images are compared with historic images to ascertain changed conditions.

3. The transportation management system of claim 2 wherein real time images are compared with a plurality of historic images to ascertain changed conditions over a period of time.

4. The transportation management system of claim 2 wherein said changed conditions are tagged for follow-up operator inspection.

5. The transportation management system of claim 3 wherein said changed conditions prompt a transportation maintenance request for attention.

6. A method for managing a transportation system, comprising:
 a display device configured to display information to an operator; and
 a controller in electronic communication with said display device and a central control device and including:
 a network switch configured to receive input data from one or more transportation control systems in response to said central control device;
 a business system module configured to monitor critical asset information in order to detect and validate status of critical assets through the use of convolutional neural networks; and
 an electronics module configured to:
 identify discrepancies among said input data from said one or more transportation control systems and said transportation data management system and for reporting said discrepancies to said central control device;
 generate corrected input data on said input data from said one or more transportation control systems and said transportation data management systems;
 wherein said controller is configured to display one or more graphical user interfaces on said display device based at least in part on the corrected input data and causes a change of position of transportation assets in response to a cumulative collection of said discrepancies.

7. The method for managing a transportation system of claim 6 wherein real time images are compared with historic images to ascertain changed conditions.

8. The method for managing a transportation system of claim 7 wherein real time images are compared with a plurality of historic images to ascertain changed conditions over a period of time.

9. The method for managing a transportation system of claim 7 wherein said changed conditions prompt a transportation maintenance request for attention.

10. The method for managing a transportation system of claim 8 wherein said changed conditions prompt a transportation maintenance request for attention.

11. A transportation management system, comprising:
 a display device configured to display information to an operator; and
 a controller in electronic communication with said display device and a central control device and including:
 a network switch configured to receive input data from one or more transportation control systems and generate a single image stream based on input data from said one or more transportation control systems in response to said central control device;
 a business systems module configured to monitor critical asset information in order to detect and validate status of critical assets through the use of convolutional neural networks; and
 an electronics module configured to:
 identify discrepancies among said input data from said one or more transportation control systems and said transportation management systems and for reporting said discrepancies to said central control device; and
 generate corrected input data based on said input data from said one or more transportation control systems and said transportation data management systems;
 wherein said controller is configured to display one or more graphical user interfaces on said display device based at least in part on said corrected input data and causes a change of position of transportation assets in response to a cumulative collection of said discrepancies and wherein said discrepancies are tagged for follow-up operator inspection.

12. The transportation management system of claim 11 wherein said discrepancies are shown in real-time to an operator.

* * * * *